US007436738B2

(12) United States Patent
Yamasaki et al.

(10) Patent No.: US 7,436,738 B2
(45) Date of Patent: Oct. 14, 2008

(54) PLAY-BACK DEVICE

(75) Inventors: Kuniko Yamasaki, Tokyo (JP); Yoshihide Koyama, Tokyo (JP)

(73) Assignee: Clarion Co., Ltd., Tokyo (JP)

( * ) Notice: Subject to any disclaimer, the term of this patent is extended or adjusted under 35 U.S.C. 154(b) by 775 days.

(21) Appl. No.: 10/669,777

(22) Filed: Sep. 25, 2003

(65) Prior Publication Data

US 2004/0106392 A1 Jun. 3, 2004

(30) Foreign Application Priority Data

Sep. 26, 2002 (JP) ........................... P2002-281285

(51) Int. Cl.
*H04B 1/20* (2006.01)
*G06F 19/00* (2006.01)

(52) U.S. Cl. ............................... 369/2; 369/21; 701/36; 307/10.1; 381/186

(58) Field of Classification Search ................. 369/1-7, 369/21; 381/300, 302, 307, 389, 186; 701/36; 307/10.1
See application file for complete search history.

(56) References Cited

U.S. PATENT DOCUMENTS 5,661,811 A * 8/1997 Huemann et al. ........... 381/309
6,330,337 B1 * 12/2001 Nicholson et al. ............. 381/86
6,845,308 B2 * 1/2005 Kobata et al. ................. 701/36
2003/0053638 A1 * 3/2003 Yasuhara ..................... 381/86
2005/0032500 A1 * 2/2005 Nashif et al. ................ 455/345

FOREIGN PATENT DOCUMENTS

JP 03-268124 11/1991
JP 2000-2114 1/2000

* cited by examiner

*Primary Examiner*—Ali Neyzari
(74) *Attorney, Agent, or Firm*—McGinn IP Law Group, PLLC

(57) ABSTRACT

A body device has a dual mode function and includes: a play-back mode setting unit for selecting a plurality of play-back modes such as a CD mode, an AM mode, an FM mode and so on; and a control unit for controlling the play-back mode setting unit so as to select an arbitrary one of the play-back modes in response to a predetermined operation on the front side or the rear side. When an operation to select and demand the FM mode on the rear side in a dual mode while the front side is in the AM mode, the control unit inhibits the FM mode selection on the rear side so that the AM mode on the front side may not be changed into the FM mode.

10 Claims, 6 Drawing Sheets

FIG. 4

36

| | |
|---|---|
| Pch-1 | AM |
| Pch-2 | FM |
| Pch-3 | AM |
| Pch-4 | SAT |
| Pch-5 | AM |
| Pch-6 | FM |

RELATED ART

PLAY-BACK DEVICE

BACKGROUND OF THE INVENTION

1. Field of the Invention

The present invention relates to a play-back device such as an audio device, which includes a plurality of play-back sources having a play-back function of recording media such as a CD, an MD, a DVD and so on and a receiving function of an AM/FM radio broadcasts, and output units such as a speaker and a headphone for outputting sound based on the play-back signals from the individual play-back sources and which is provided with a function such as a dual media function to output sound based on the play-back signals from the different play-back sources simultaneously from both the speaker and the headphone.

2. Description of the Related Art

In recent years, the audio device having such dual media function is applied to a vehicular audio system.

FIG. 6 is a system construction diagram showing the entire construction of the vehicular audio system having a general dual media function.

The vehicular audio system 100, as shown in FIG. 6, includes: a body device 101 arranged on the front side in a vehicular compartment and provided with a plurality of play-back sources including a CD play-back function and a receiving function of an AM/FM radio; a front operation unit 102 for operating the body device 101 on the front side; a rear operation unit 103 for operating the body device 101 remotely on the rear side in the compartment; and a speaker 104 and a headphone 105 for outputting sound based on sound signals coming from the play-back sources of the body device 101.

The speaker 104 is composed of two front speakers 104A arranged on the front side, and two rear speakers 104B arranged on the rear side. On the other hand, the headphone 105 is arranged on the rear side.

Moreover, the play-back sources include the CD play-back unit and the AM/FM radio tuner unit, the latter of which acts as an AM tuner and an FM tuner so that it can receive the AM broadcast and the FM broadcast by itself.

Here, the front operation unit 102 corresponds to the front panel, as arranged on the front side, of the body device 101, and the rear operation unit 103 corresponds to the remote operation unit arranged on the rear side.

Moreover, the front operation unit 102 and the rear operation unit 103 are provided a play-back mode key for selecting at least one from a plurality of play-back sources, and a preset key capable of receiving the receiving frequency of the radio broadcasting station registered in advance, by a single-touch operation. Here, the play-back modes are exemplified in the CD mode for selecting and operating the CD play-back unit as the play-back source, the AM mode for selecting and operating the AM/FM radio tuner unit to receive the AM broadcast, and the FM mode for selecting and operating the AM/FM radio tuner unit to receive the FM broadcast.

Moreover, the body device 101 has a dual media function and can be switched and set to a single mode or a dual mode as the system setting mode in response to a predetermined operation from the front operation unit 102.

In the single mode, the sound based on the sound signals from one of the play-back sources are outputted exclusively from the speaker 104.

In the dual mode, the sound based on the sound signals from one of the play-back sources are outputted from the speaker 104, whereas the sound based on the sound signals from another play-back source are outputted from the headphone 105.

In case the body device 101 is demanded for provisions of sound signals from different play-back sources such that a passenger on the front side requests the FM mode whereas a passenger on the rear side requests the CD mode, the dual mode can be set by operating the front operation unit 102 in a predetermined manner. Then, the sound based on the sound signals of the FM broadcast can be outputted on the front side from the speaker 104, and the sound based on the sound signals from the CD play-back unit can be outputted on the rear side from the headphone 105.

In short, the front passenger and the rear passenger can accept the sound signals from the different play-back sources through the speaker 104 and the headphone 105.

According to the vehicular audio system 100 having such dual media function, the dual mode can be set in response to the predetermined operation of the front operation unit 102. In this dual mode, the sound signals from the different play-back sources can be provided through the speaker 104 and the headphone 105. Therefore, the front and rear passengers can listen to the sound signals from the different play-back sources.

According to the vehicular audio system 100 provided with the aforementioned general dual media function, however, if the FM mode is set on the rear side while the sound based on the play-back signals of the AM broadcast from the speaker 104 are being outputted by setting the AM mode on the front side, for example, the AM mode being set on the front side is switched to the FM mode because the single tuner acts as the AM and FM tuners.

In short, the following fluctuation occurs according to this vehicular audio system 100. The play-back signals (e.g., the play-back signals of the AM broadcast) to be outputted to the output unit (e.g., the speaker 104 or the output unit on the front side) other than at least one of the output units (e.g., the headphone 105 or the output unit on the rear side) are switched by the selection and change (e.g., the selective mode change) to the play-back source (e.g., the FM mode) relating to the play-back signals (e.g., the play-back signals of the FM broadcast) to be outputted to the at least one of the output unit (e.g., the headphone 105 or the output unit on the rear side) by the predetermined operation (e.g., the key operation of the mode selecting key of the rear operation unit).

SUMMARY OF THE INVENTION

The present invention has been conceived in view of the aforementioned point and has an object to provide a play-back device, which can prevent it reliably that the play-back signals to be outputted to the output units other than the at least one of the output units relating to the predetermined operation might otherwise be fluctuated by the selection and change of the play-back sources by that predetermined operation.

In order to achieve the above-specified object, according to a first aspect of the invention, there is provided a play-back device including: a plurality of play-back sources; a plurality of output units for outputting the play-back signals from the individual play-back sources; a select unit for selecting at least one of the play-back sources; and a control unit for controlling the select unit so as to select the at least one of the play-back sources for outputting the play-back signals to be outputted to the output units, in response to a predetermined operation, wherein the control unit includes: a fluctuation deciding unit for selecting, when the at least one of the play-back sources is selected and when the operation to output the play-back signals from the at least one of the play-back sources to at least one of the output units is detected, the at least one of the play-back sources relating to the operation, thereby to decide whether or not a fluctuation occurs in the play-back signals to be outputted from the output units other than the at least one of the output units relating to the operation; and a selection inhibiting unit for inhibiting the selection and change to the at least one of the play-back sources relating to the operation, when the fluctuation occurs in the play-back signals is decided by the fluctuation deciding unit.

According to the first aspect of the invention, therefore, when at least one of the play-back sources is selected so that a predetermined operation to output the play-back signals from the at least one of the play-back sources to at least one of the output units, it is decided by selecting the at least one of the play-back sources relating to the predetermined operation whether or not a fluctuation occurs in the play-back signals to be outputted from output units other than the at least one of the output units relating to that predetermined operation. If it is decided that the fluctuation occurs in the play-back signals, the selection and change to the at least one of the play-back sources relating to the predetermined operation is inhibited. Even if the operation relating to the selection and change of the play-back sources , as might otherwise change the play-back signals, is done from the rear side while the play-back signals are being outputted from the output units (i.e., the output units other than the at least one of the output units) on the front side, for example, it is possible to prevent such a fluctuation reliably that the play-back signals to be outputted to the output units on the front side are switched.

According to a second aspect of the invention, there is provided a play-back device including: a plurality of play-back sources including a broadcast receiving unit capable of receiving broadcasts of a plurality of broadcasting bands; a plurality of output units for outputting the play-back signals from the individual play-back sources; a select unit for selecting at least one of the play-back sources and for selecting that of the broadcasting bands, which is received by the broadcast receiving unit; and a control unit for controlling the select unit so as to select at least one of the broadcasting band to be outputted to the at least one of the output units, in response to a predetermined operation, wherein the control unit controls the select unit, when it detects the predetermined operation, so as to inhibit the changing and selecting actions of the broadcasting bands relating to the broadcast receiving unit, in case the play-back signals to be outputted to the output units other than the at least one of the output units relating to the predetermined operation is the play-back signals from the broadcast receiving unit.

According to the second aspect of the invention, therefore, when there is detected a predetermined operation to select the play-back signals of at least one of broadcasting band signals to be outputted to at least one of the output units, in case the play-back signals to be outputted to output units other than the at least one of the output units relating to that predetermined operation are the play-back signals from a broadcast receiving unit, the action to select and change the broadcasting band relating to that the broadcast receiving unit is inhibited. In case the broadcast receiving unit is the AM/FM radio tuner unit acting the AM and FM tuners by itself, therefore, even if the operation relating to the selection and change of the play-back sources (i.e., the FM mode), as might otherwise change the play-back signals, is done from the rear side while the play-back signals of the AM broadcast on the front side are being outputted from the output units (i.e., the output units other than the at least one of the output units) on the front side, for example, it is possible to prevent such a fluctuation reliably that the play-back signals of the AM broadcast to be outputted to the output units on the front side are switched.

BRIEF DESCRIPTION OF THE DRAWINGS

The above objects and advantages of the present invention will become more apparent by describing preferred exemplary embodiments thereof in detail with reference to the accompanying drawings, wherein:

FIG. 4 is an explanatory diagram showing one example of the memory contents of a Pch memory relating to this embodiment;

DETAILED DESCRIPTION OF THE PREFERRED EMBODIMENTS

Figure 1:
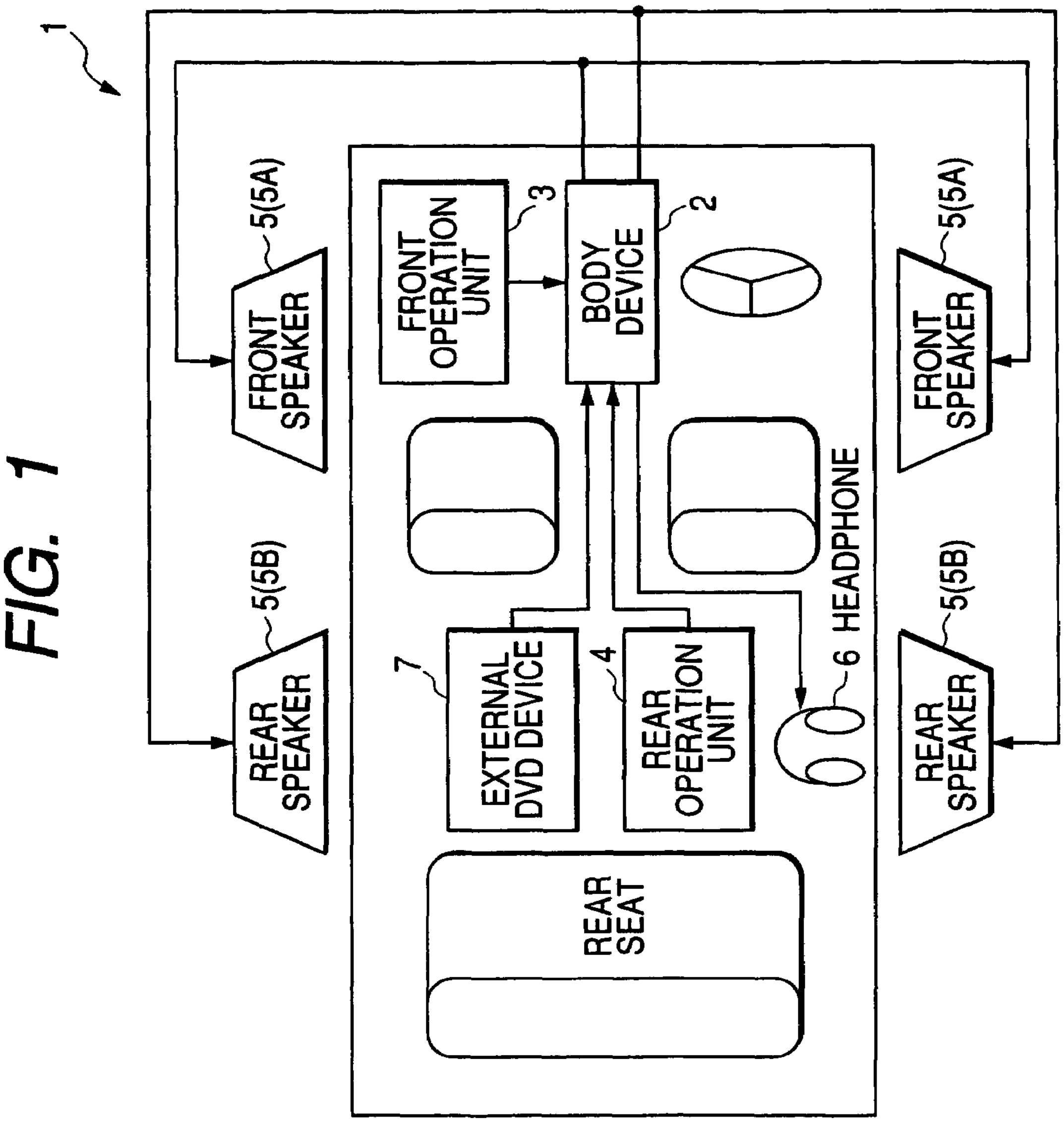
FIG. 1 is a system construction diagram showing the entire construction of a vehicular audio system according to an embodiment of a play-back device of the invention.

Hereinafter, prior to describing preferred embodiments of the invention, various aspects of the invention will be described.

According to a first aspect of the invention, there is provided a play-back device including: a plurality of play-back sources; a plurality of output units for outputting the play-back signals from the individual play-back sources; a select unit for selecting at least one of the play-back sources; and a control unit for controlling the select unit so as to select the at least one of the play-back sources for outputting the play-back signals to be outputted to the output units, in response to a predetermined operation, wherein the control unit includes: a fluctuation deciding unit for selecting, when the at least one of the play-back sources is selected and when the predetermined operation to output the play-back signals from the at least one of the play-back sources to at least one of the output units is detected, the at least one of the play-back sources relating to the predetermined operation, thereby to decide whether or not a fluctuation occurs in the play-back signals to be outputted from the output units other than the at least one of the output units relating to the predetermined operation; and a selection inhibiting unit for inhibiting the selection and change to the at least one of the play-back sources relating to the predetermined operation, when it is decided by the fluctuation deciding unit that the fluctuation occurs in the play-back signals.

According to the first aspect of the invention, therefore, when at least one of the play-back sources is selected so that a predetermined operation to output the play-back signals from the at least one of the play-back sources to at least one of the output units, it is decided by selecting the at least one of the play-back sources relating to the predetermined operation whether or not a fluctuation occurs in the play-back signals to be outputted from output units other than the at least one of the output units relating to that predetermined operation. If it is decided that the fluctuation occurs in the play-back signals, the selection and change to the at least one of the play-back sources relating to the predetermined operation is inhibited.

Even if the operation relating to the selection and change of the play-back sources, as might otherwise change the play-back signals, is done from the rear side while the play-back signals are being outputted from the output units (i.e., the output units other than the at least one of the output units) on the front side, for example, it is possible to prevent such a fluctuation reliably that the play-back signals to be outputted to the output units on the front side are switched.

According to a second aspect of the invention, there is provided a play-back device including: a plurality of play-back sources including a broadcast receiving unit capable of receiving broadcasts of a plurality of bands; a plurality of output units for outputting the play-back signals from the individual play-back sources; a select unit for selecting at least one from the play-back sources and for selecting that of the broadcasting bands, which is received by the broadcast receiving unit; and a control unit for controlling the select unit so as to select the at least one of the broadcasting bands to be outputted to the at least one of the output units, in response to a predetermined operation, wherein the control unit controls the select unit, when it detects the predetermined operation, so as to inhibit the changing and selecting actions of the broadcasting bands relating to the broadcast receiving unit, in case the play-back signals to be outputted to the output units other than the at least one of the output units relating to the predetermined operation is the play-back signals from the broadcast receiving unit.

According to the second aspect of the invention, therefore, when there is detected a predetermined operation to select the play-back signals of at least one of broadcasting band signals to be outputted to at least one of the output units, in case the play-back signals to be outputted to output units other than the at least one of the output units relating to that predetermined operation are the play-back signals from a broadcast receiving unit, the action to select and change the broadcasting band relating to that the broadcast receiving unit is inhibited. In case the broadcast receiving unit is the AM/FM radio tuner unit acting the AM and FM tuners by itself, therefore, even if the operation relating to the selection and change of the play-back sources (i.e., the FM mode), as might otherwise change the play-back signals, is done from the rear side while the play-back signals of the AM broadcast on the front side are being outputted from the output units (i.e., the output units other than the at least one of the output units) on the front side, for example, it is possible to prevent such a fluctuation reliably that the play-back signals of the AM broadcast to be outputted to the output units on the front side are switched.

According to a third aspect of the invention, in addition to the second aspect of the invention, the control unit controls the select unit, when it detects the predetermined operation, so as to inhibit the changing and selecting actions to the at least one of the broadcasting bands relating to the predetermined operation to switch the broadcasting band, in case the play-back signals to be outputted to the output units other than the at least one of the output units relating to the predetermined operation is the play-back signals of the broadcasting band from the broadcast receiving unit.

According to the third aspect of the invention, therefore, when the predetermined operation is detected, in case the play-back signals to be outputted to the output units other than the at least one of the output units relating to that predetermined operation are the play-back signals of the broadcasting band from the broadcast receiving unit, there is inhibited the selective changing operation to change the broadcasting band to the at least one of the broadcasting bands relating to the predetermined operation. Even if the operation relating to the selection and change of the play-back sources (in the FM mode), as might otherwise change the play-back signals of the AM broadcast on the front side into the play-back signals of the FM broadcast, is done from the rear side while the play-back signals of the AM broadcast are being outputted from the output units (i.e., the output units other than the at least one of the output units) on the front side, for example, it is possible to prevent such a fluctuation reliably that the play-back signals of the AM broadcast to be outputted to the output units on the front side are switched to the play-back signals of the FM broadcast.

According to a fourth aspect of the invention, in addition to the first to third aspect of the invention, at least one of the output units is a speaker, and at least one of the output units is a headphone.

According to the fourth aspect of the invention, therefore, at least one output units is the speaker whereas at least one output units is the headphone such that the output units (i.e., the output units other than the at least one of the output units) on the front side is the speaker whereas the output units (i.e., the at least one of the output units) on the rear side is the headphone. Even if the operation relating to the selection and change of the play-back sources , as might otherwise change the play-back signals on the front side, is done from the rear side while the play-back signals are being outputted from the output units (i.e., the output units other than the at least one of the output units) on the front side, it is possible to prevent such a fluctuation reliably that the play-back signals to be outputted to the output units on the front side are switched.

With reference to the accompanying drawings, here will be described a vehicular audio system having dual media functions according to an embodiment of a play-back device of the invention. FIG. 1 is a system construction diagram showing the entire construction of a vehicular audio system according to the embodiment.

The vehicular audio system 1, as shown in FIG. 1, includes: a body device 2 arranged on the front side in a vehicular compartment and having a plurality of play-back sources provided with a CD play-back function and a receiving function of an AM/FM radio or the like; a front operation unit 3 for operating the body device 2 on the front side; a rear operation unit 4 for operating the body device 2 remotely on the rear side in the compartment; and a speaker 5 and a headphone 6 for aurally outputting sound signals coming from the play-back function of the body device 2.

The vehicular audio system 1 further includes an electronic device such as an external DVD device 7 connected from the outside with the body device 2.

The speaker 5 is composed of two front speakers 5A arranged on the front side, and two rear speakers 5B arranged on the rear side. On the other hand, the headphone 6 is arranged on the rear side.

On the other hand, the play-back source is provided with the CD play-back function, the satellite broadcasting (as will be abbreviated as the "SAT") radio receiving function and the AM/FM radio function.

Here, the front operation unit 3 corresponds to the front panel, as arranged on the front side, of the body device 2, and the rear operation unit 4 corresponds to the remote operation unit arranged on the rear side.

Moreover, the front operation unit 3 and the rear operation unit 4 are provided with a play-back mode selecting key (as will be abbreviated as the "MODE key") for selecting at least one of the play-back sources, and a preset key (as will be abbreviated as the "NEXT key") capable of receiving the receiving frequency of a radio broadcasting station registered in advance, by a single operation.

Figure 2:
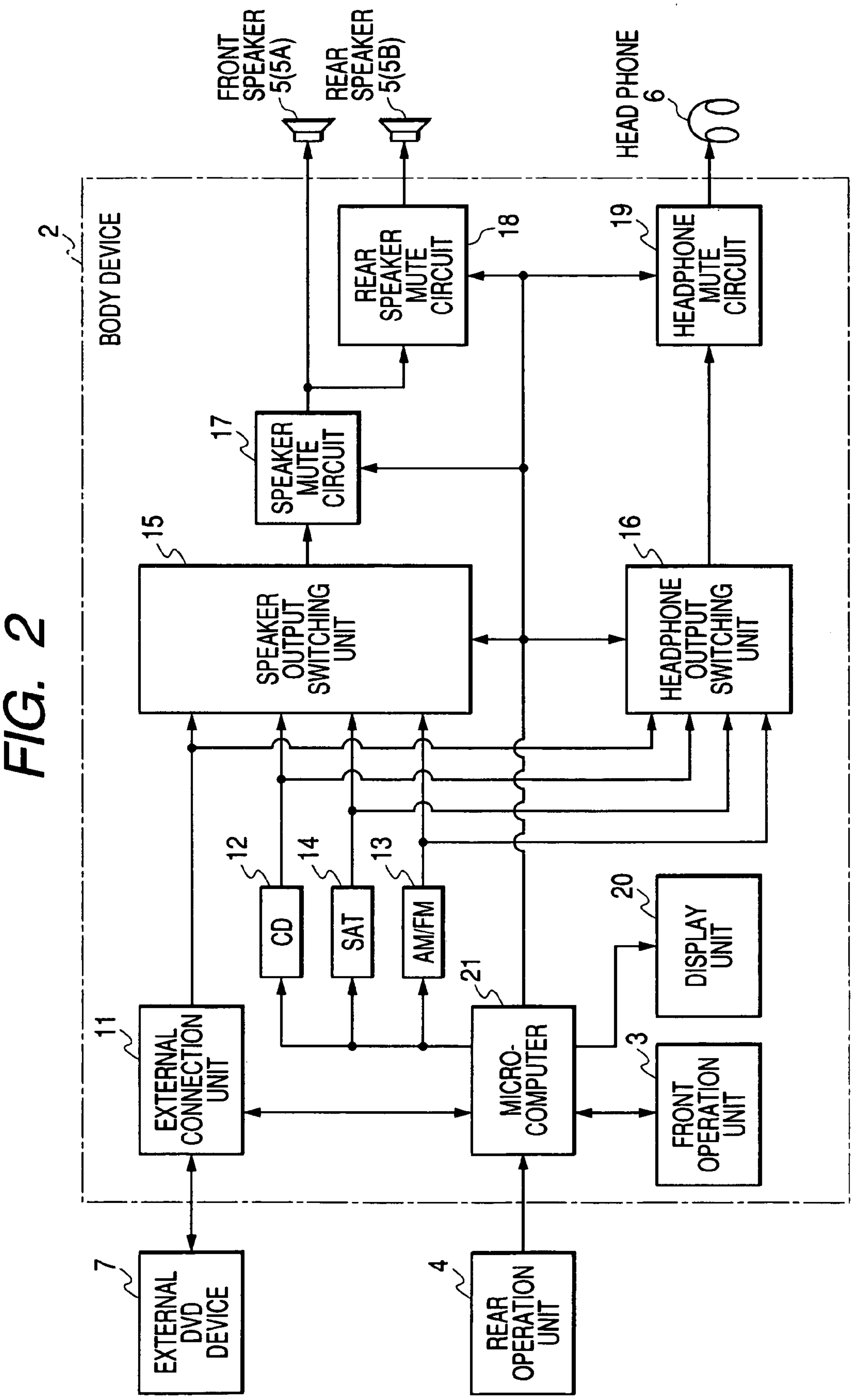
FIG. 2 is a block diagram showing the schematic construction of the inside of the body device according to this embodiment.

FIG. 2 is a block diagram showing the schematic construction of the inside of the body device 2 according to this embodiment.

The body device 2, as shown in FIG. 2, includes: an external connection unit 11 to be connected with the external DVD device 7; a CD play-back unit 12, an AM/FM radio tuner unit 13, a SAT ratio tuner unit 14 acting as a plurality of play-back sources; a speaker output switching unit 15 for selecting a play-back source to be outputted to the speaker 5, from the play-back sources including the external DVD device 7, the CD play-back unit 12, the AM/FM radio tuber unit 13 and the SAT radio tuber unit 14, to the speaker 5; a headphone output switching unit 16 for selecting a play-back source of the sound signals to be outputted to the headphone 6; a speaker mute circuit 17 for muting the sound signals from the play-back source, as selected by the speaker output switching 15, to the speaker 5; a rear speaker mute circuit 18 for muting the sound signals to the rear speakers SB; a headphone mute circuit 19 for muting the sound signals from the play-back source, as selected by the headphone output switching unit 16, to the headphone 6; a display unit 20 for displaying various pieces of information; and a microcomputer 21 for controlling the body device 2 as a whole.

The AM/FM radio tuner unit 13 acts as both the AM tuner and the FM tuner to receive the AM broadcast and the FM broadcast with the single tuner.

The body device 2 has dual media functions and can be switched and set to a single mode or a dual mode as the system setting mode in response to a predetermined operation from the front operation unit 3 or the rear operation unit 4.

In the single mode, the sound signals from one of the play-back sources are aurally outputted exclusively from the speaker 5.

In the dual mode, the sound signals from one of the play-back sources are aurally outputted from the speaker 5, whereas the sound signals from the same play-back source or another play-back source are aurally outputted from the headphone 6.

This dual mode is divided into an ordinary dual mode and a special dual mode. The ordinary dual mode is set in case the dual mode is accepted while the power of the body device 2 is ON. The special dual mode is set when the power of the body device 2 is turned ON in response to a power ON demand signal from the rear operation unit 4 or the external DVD device 7 while the power of the body device 2 is OFF. Here, these ordinary dual mode and special dual mode are not the system setting modes to be separately set, but such a dual mode as is expressed for conveniences of description separately as the ordinary one and the special one in accordance with the setting conditions.

Here, the power ON demand signal from the external DVD device 7 is outputted in response to the power ON of the external DVD device 7, the disc insertion into the external DVD device 7 or a playing operation of the external DVD device 7, for example. The power ON demand signal from the rear operation unit 4 is outputted in response to a power ON demand from the rear operation unit 4 to the body device 2.

On the other hand, the body device 2 is provided with a plurality of play-back modes, which can be switched and selected by the aforementioned MODE key. Here, the play-back modes are divided into: a CD mode for selecting/operating the CD play-back unit 12, a SAT mode for selecting/operating the SAT radio tuner unit 14 to for receive the satellite broadcast; an AM mode for selecting/operating the AM/FM radio tuner unit 13 to receive the AM broadcast; an FM mode for selecting/operating the AM/FM radio tuner unit 13 to receive the FM broadcast; and a DVD mode for selecting/operating the external DVD device 7.

Figure 3:
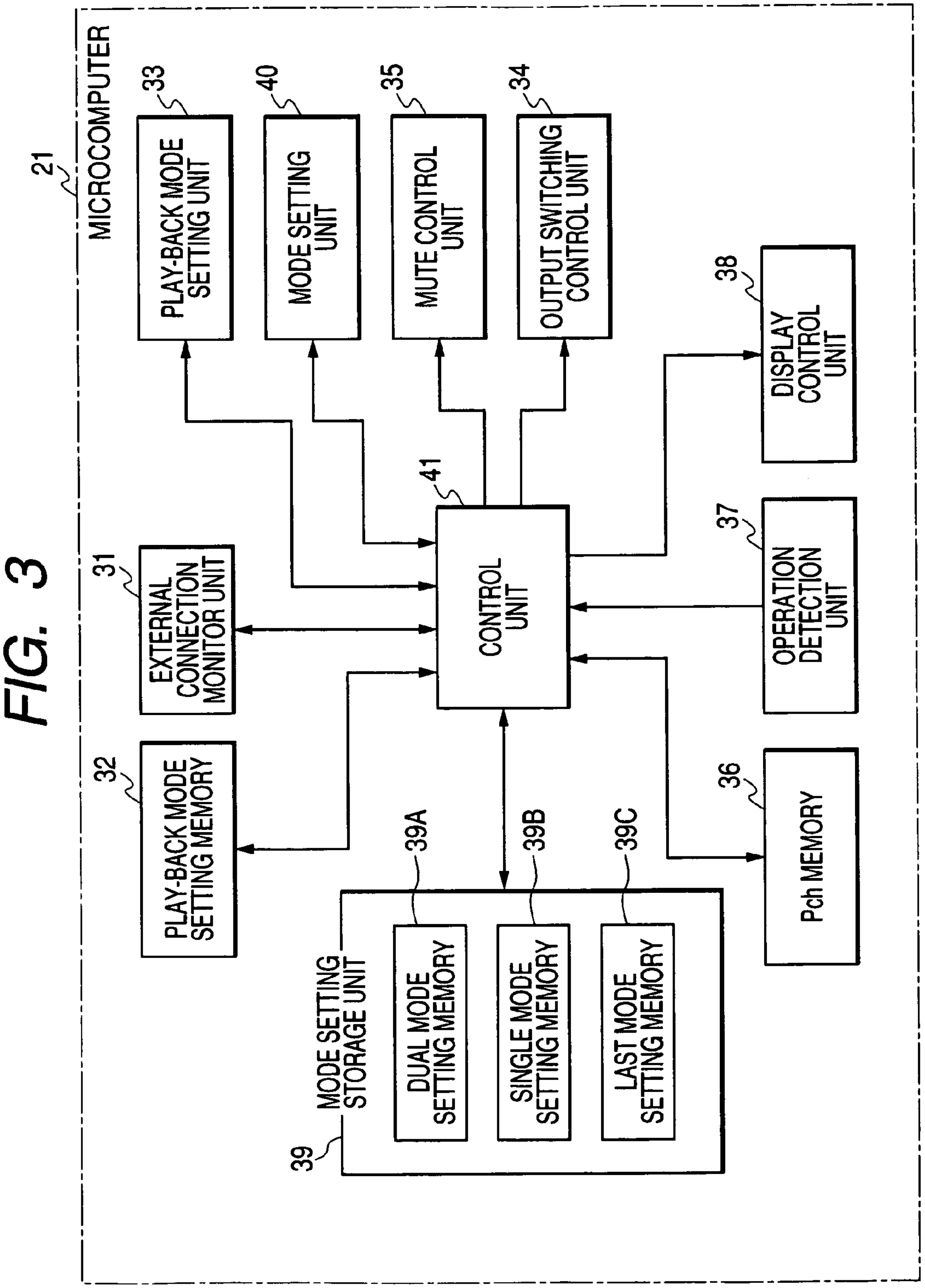
FIG. 3 is a block diagram showing the schematic construction of the inside of a microcomputer of the body device according to this embodiment.

FIG. 3 is a block diagram showing the schematic construction of the inside of the microcomputer 21 of the body device 2 according to this embodiment.

The microcomputer 21, as shown in FIG. 3, includes: an external connection monitor unit 31 for monitoring the external DVD device 7 through the external connection unit 11; a play-back mode setting memory 32 stored with the set contents relating the play-back modes such as the CD mode, the SAT mode, the AM mode, the FM mode and the DVD mode; a play-back mode setting unit 33 for reading the set contents corresponding to the play-back mode from the play-back mode setting memory 32, in response to the mode selecting operation of the MODE key, for example, to set the same play-back mode on the basis of the set contents; an output switching control unit 34 for controlling the speaker output switching unit 15 and the headphone output switching unit 16 on the basis of the play-back mode set at that play-back mode setting unit 33; a mute control unit 35 for controlling the speaker mute circuit 17, the rear speaker mute circuit 18 and the headphone mute circuit 19; a Pch memory 36 stored with the receiving frequencies of the individual radio broadcasting stations, which can be received in response to the preset channel (as will be abbreviated as the "Pch") of the NEXT key, for example; an operation detection unit 37 for detecting the input operations from the front operation unit 3 and the rear operation unit 4; a display control unit 38 for controlling the display of the display unit 20; a mode setting storage unit 39 stored with the set contents relating to the system setting mode such as the single mode or the dual mode; a mode setting unit 40 for setting the system setting mode on the basis of the set contents stored in the mode setting storage unit 39; and a control unit 41 for controlling that microcomputer 21 as a whole.

The play-back mode setting unit 33: monitors the mode selecting operation of the MODE key from the front operation unit 3 and the rear operation unit 4; reads the set contents corresponding to the play-back mode of the mode selecting operation, from the play-back mode setting memory 32; and sets the play-back mode on the basis of the set contents. Here, the MODE key adopts the toggle type, in which the play-back mode is selected in the order of the AM mode→the FM mode→the SAT mode→the CD mode→the DVD mode→the AM mode→the FM mode, - - - , and so on, for example.

As shown in FIG. 4, the Pch memory 36 is composed of six memory areas Pch-1 to Pch-6, for example, which are individually stored with the receiving frequencies relating the predetermined broadcasting stations of the AM broadcast, the FM broadcast and the SAT broadcast. For example: the area Pch-1 is stored with the receiving frequency of the AM broadcasting station; the area Pch-2 with the receiving frequency of the FM broadcasting station; the area Pch-3 with the receiving frequency of the AM broadcasting station; the area Pch-4 with the receiving frequency of the SAT broadcasting station; the area Pch-5 with the receiving frequency of the AM broadcasting station; and the area Pch-6 with the receiving frequency of the FM broadcasting station.

The control unit 41: monitors the Pch selecting operation of the NEXT key from the front operation unit 3 and the rear operation unit 4 through the operation detection unit 37; reads the receiving frequency stored in the Pch of the Pch selecting operation; and executes the receiving action of the receiving frequency through the AM/FM radio tuner unit 13 or the SAT radio tuner unit 14. Here, the NEXT key adopts the toggle type, in which the Pch is selected in the order of Pch-1→Pch-2→Pch-3→Pch-4→Pch-5→Pch-6→Pch-1→Pch-2, - - - , and so on, for example.

The mode setting storage unit 39 includes: a single mode setting memory 39B stored with the set contents of the single mode; a dual mode setting memory 39A stored with the set contents of the dual mode; and a last mode setting memory 39C for storing the play-back mode of the front, which has been set just before the power source of the body device 2 was turned OFF, as the last play-back source.

Here, the last mode setting memory 39C stores, when the power of the body device 2 is turned OFF, the last play-back mode that has been aurally outputted by the speaker 5 just before the power OFF, as the last play-back source.

In the set contents of the single mode to be stored in the single mode setting memory 39B, only the aural outputs from the front speakers 5A and the rear speakers 5B are made effective, so that the speaker mute circuit 17 and the rear mute circuit 18 are muted OFF whereas the headphone mute circuit 19 is muted ON.

The dual mode setting memory 39A is stored with the set contents relating to the ordinary dual mode and the special dual mode. In the set contents of the ordinary dual mode, the aural outputs from the front speakers 5A and the headphone 6 are different identical play-back sources and are made effective. Therefore: the speaker mute circuit 17 is muted OFF; the rear mute circuit 18 is muted ON; and the headphone mute circuit 19 is muted OFF. Here, the output units on the front side is only the front speakers 5A, and the output units on the rear side is only the headphone 6.

In the set contents of the special dual mode, moreover, the aural outputs from the front speakers 5A and the headphone 6 are different or identical play-back sources, and only the aural output from the headphone 6 is made effective, so that the speaker mute circuit 17 and the rear mute circuit 18 are muted ON whereas the headphone mute circuit 19 is muted OFF.

The mode setting unit 40 sets the system mode on the basis of the set contents of the dual mode setting memory 39A and the single mode setting memory 39B. On the basis of these set contents, moreover, the mute control unit 35 controls the speaker mute circuit 17, the rear mute circuit 18 and the headphone mute circuit 19.

The output switching control unit 34 controls the speaker output switching unit 15 and the headphone output switching unit 16 for selecting/outputting the sound signals from the designated one of the play-back sources.

Here in the invention: the play-back device corresponds to the body device 2; the play-back source to the CD play-back unit 12 (i.e., the CD mode), the AM/FM radio tuner unit 13 (i.e., the AM mode and the FM mode), the SAT radio tuner unit 14 (i.e., the SAT mode) and the external DVD device 7 (i.e., the DVD mode); the output units to the speaker 5 and the headphone 6; the select unit to the speaker output switching unit 15, the headphone output switching unit 16, the play-back mode setting unit 33 and the control unit 41; the control unit to the control unit 41; the fluctuation deciding unit to the control unit 41; the selection inhibiting unit to the control unit 41; and the broadcasting band to the AM broadcast and the FM broadcast.

Here will be described the actions of the vehicular audio system 1 according to this embodiment.

In the microcomputer 21 of the body device 2, when the DVD mode is set in the single mode, for example, the output switching control unit 32 controls the speaker output switching unit 15 so that the sound signals from the external DVD device 7 may be selected and outputted.

On the basis of the set contents stored in a single mode setting memory 39B, moreover, the mute control unit 33 mutes OFF the speaker mute circuit 17 and the rear mute circuit 18 but ON the headphone mute circuit 19.

Here in the body device 2, the voice signals from the external DVD device 7 are aurally outputted only from the front speakers 5A and the rear speakers 5B but not from the headphone 6.

In the microcomputer 21 of the body device 2, on the other hand, when case there is set the ordinary dual mode for setting the CD mode on the front side and the DVD mode on the rear side, the output switching control unit 32 controls the speaker output switching unit 15 so that the sound signals from the CD play-back unit 12 may be selected and outputted to the front side, and the headphone output switching unit 16 so that the sound signals from the external DVD device 7 may be selected and outputted to the rear side.

On the basis of the set contents of the ordinary dual mode stored in the dual mode setting memory 39A, moreover, the mute control unit 33 mutes OFF the speaker mute circuit 17, ON the rear mute circuit 18 and OFF the headphone mute circuit 19.

The body device 2 can output the sound signals from the CD play-back unit 12 aurally not from the rear speakers 5B but from only the front speakers 5A, and can output the voice signals from the external DVD device 7 aurally from the headphone 6. In short, the front side outputs the sound signals aurally from the CD play-back unit 12 and the sound signals aurally from the external DVD device 7.

In the microcomputer 21 of the body device 2, on the other hand, when there is set the special dual mode for setting the DVD mode on the rear side, the output switching control unit 32 selects the play-back source on the basis of the last play-back source information stored in the last mode setting memory 39C, and controls the speaker output switching unit 15 so that the sound signals from that play-back source may be selected and outputted to the front side. At the same time, the output switching control unit 32 controls the headphone output switching unit 16 so that the sound signals from the external DVD device 7 may be selected and outputted to the rear side.

On the basis of the set contents of the special dual mode stored in the dual mode setting memory 39A, moreover, the mute control unit 33 mutes ON the speaker mute circuit 17 and the rear mute circuit 18 and OFF the headphone mute circuit 19.

The body device 2 can output the sound signals from the external DVD device 7 aurally not from the front speakers 5A and the rear speakers 5B but from only the headphone 6. In short, the sound signals from the external DVD device 7 are aurally outputted from the rear side.

Figure 5:
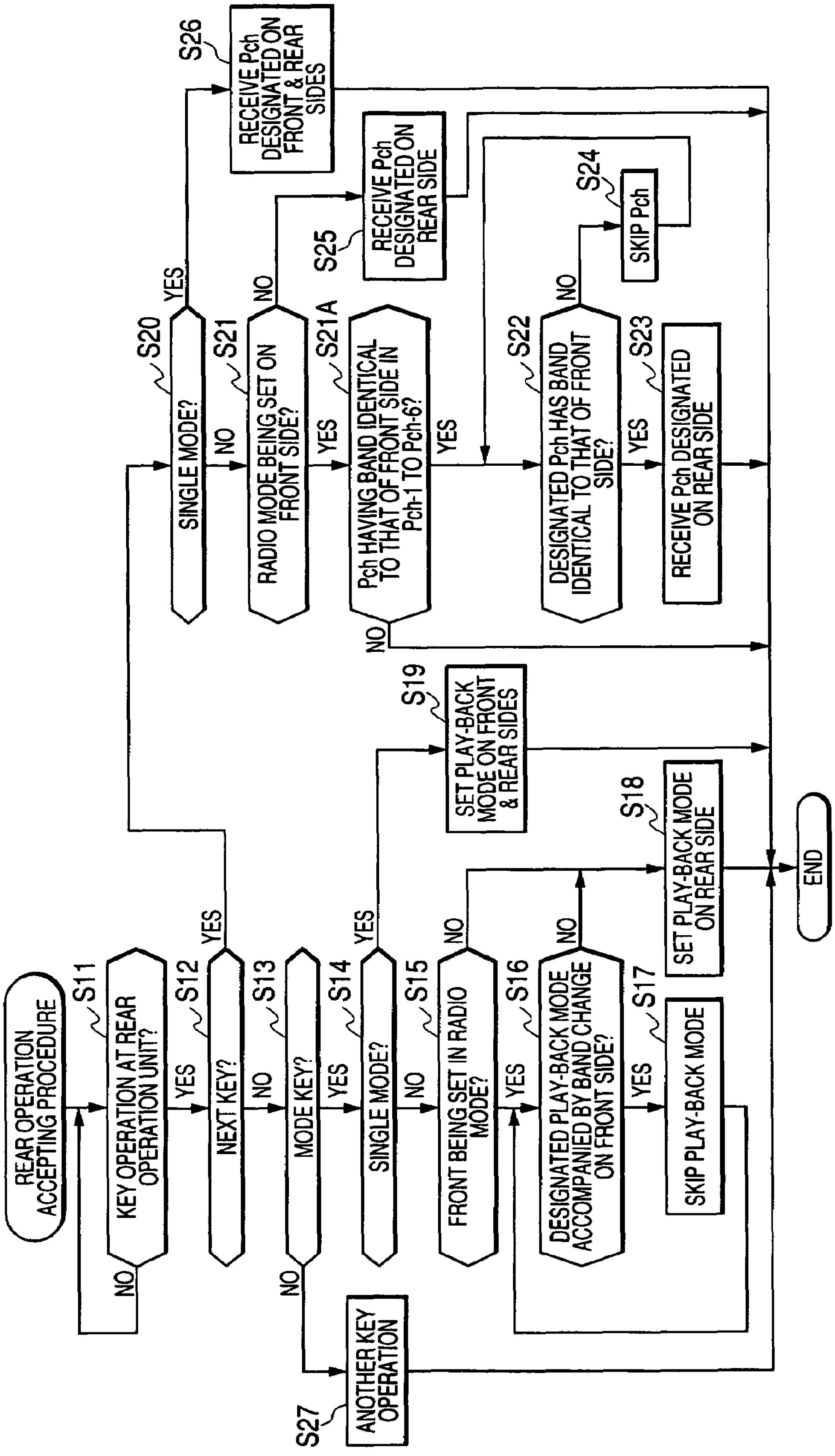
FIG. 5 is a flow chart showing the processing actions of the microcomputer to participate in the starting mode setting procedure of the body device according to this embodiment.
Figure 6:
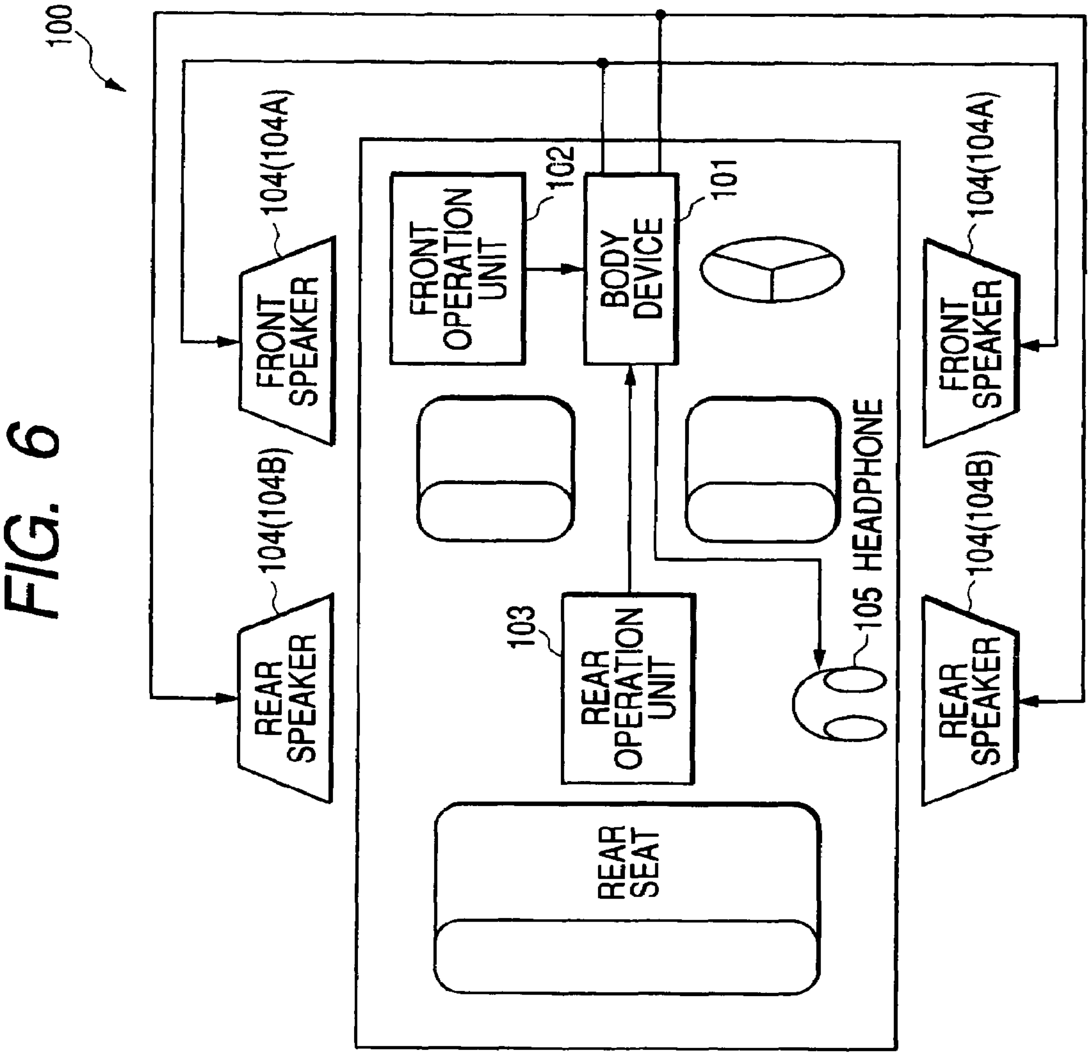
FIG. 6 is a system construction diagram showing the entire construction of a vehicular audio system having a general dual media function.

Here will be described the rear operation accepting procedure of the body device 2. FIG. 5 is a flow chart showing the processing actions of the microcomputer 21 to participate in the rear operation accepting procedure of the body device 2.

The rear operation accepting procedure shown in FIG. 5 is a key accepting procedure of the case, in which the MODE key, the NEXT key or the like is operated from the rear operation unit 4.

In FIG. 4, the control unit 41 of the microcomputer 21 decides it (at Step S11) through the operation detection unit 37 whether or not the key operation has been detected.

If the key operation from the rear operation unit 4 is detected, the control unit 41 decides (at Step S12) whether or not the key operation is the NEXT key.

If the key operation of the NEXT key is not decided, the control unit 41 decides (at Step S13) whether or not the key operation is the MODE key.

If the key operation of the MODE key is decided, the control unit 41 decides (at Step S14) whether or not the prevailing system setting mode is the single mode.

If it is decided that the prevailing mode is not the single mode, the control unit 41 decides (at Step S15) whether or not the front side is in the radio mode (i.e., the AM mode or the FM mode) having selected the AM/FM radio tuner unit 13.

Here, the mode selected by the front side corresponds to the play-back mode, which has been selected in the dual mode by the front passenger. In case the front side is in the AM mode, for example, it is assumed that the AM/FM radio tuner unit 13 selects the band of the AM broadcast so that the sound signals of the AM broadcast received by the AM/FM radio tuner unit 13 are being aurally outputted from the front speakers 5A.

If it is decided at Step S15 that the front side is in the radio mode, the control unit 41 decides (at Step S16) whether or not the designated play-back mode is accompanied by the band change on the front side.

Here, the designated mode corresponds to the play-back mode, which has been selected with the MODE key of the rear operation unit 4, for example. When the FM mode is set on the rear side while the front side is in the AM mode, for example, the front side is changed in the prior art from the AM mode to the FM mode. In short, the mode accompanied by the band change of the front side is the FM mode, in case the front side is in the AM mode, and the AM mode in case the front side is in the FM mode.

If it is decided that the play-back mode designated at Step S16 is the mode accompanied by the band change on the front side, the control unit 41 inhibits the selection of that play-back mode, and executes the play-back mode skipping operation (at Step S17) so as to designate the next play-back mode on the basis of the order of selecting the play-back mode. The control unit 41 transfers to Step S16 so as to judge whether or not the play-back mode designated at that play-back mode skipping action is accompanied by the band change on the front side.

Here in the play-back mode skipping action of Step S17, in case the FM mode is designated from the rear side while the front side is in the AM mode, the selecting order of the play-back mode is the AM→mode→the FM mode→the SAT mode→the CD mode→- - - , and so on. Therefore, the selection of the FM mode is inhibited, and the next SAT mode is designated. Even if the SAT mode is set on the rear side, moreover, the satellite broadcast is received in the SAT mode not by the AM/FM radio tuner unit 13 but by the SAT radio tuner unit 14, so that the AM mode on the front side is not switched.

If it is decided at Step S15 that the front side is not in the radio mode or if it is decided at Step S16 that the designated play-back mode is not accompanied by the band change on the front side, on the other hand, the play-back mode setting unit 33 of the control unit 41 ends these processing actions by setting (at Step S18) the designated play-back mode as the play-back mode of the rear side. Here, the mode set on the rear side corresponds to the play-back mode, which has been selected in the dual mode on the rear side.

If it is decided at Step S14 that the prevailing system setting mode is the single mode, the play-back mode setting unit 33 of the control unit 41 ends these processing operations by setting (at Step S19) that the play-back mode on the front side and on the rear side is set to the designated play-back mode.

If it is decided at Step S12 that the key operation is the NEXT key, on the other hand, the control unit 41 decides (at Step S20) that the prevailing system setting mode is the single mode.

If it is decided that the prevailing system setting mode is not the single mode, the control unit 41 judges that the prevailing mode is the dual mode, and decides (at Step S21) whether or not the front side is in the radio mode (i.e., the AM mode or the FM mode).

If it is decided that the front side is in the radio mode, the control unit 41 decides (at Step S21A) whether or not there is a Pch with an identical broadcasting band is in Pch-1 to Pch-6. If it is decided that there is the Pch with the band identical to that of the front side, the control unit 41 decides (at Step S22) whether or not the designated Pch broadcasting band is identical to that of the front side. Here, the designated Pch corresponds to the AM broadcast in case it is the broadcasting band corresponding to the Pch selected with the NEXT key of the rear operation unit 4, i.e., the Pch-1.

If the broadcasting band of the designated Pch is identical to the band of the front side, the control unit 41 ends these processing actions by executing the receiving actions (at Step S23) on the basis of the receiving frequency of the designated Pch through the AM/FM radio tuner unit 13 or the SAT radio tuner unit 14.

Here, the broadcasting band of the designated Pch is identical to that of the front side, in case the Pch of the receiving frequency of the AM broadcast is designated on the rear side while the front side is in the AM mode, for example, that is, in case the identical band is designated on the front side and on the rear side.

The control unit 41 ends these processing actions if it is decided at Step S21A that the Pch of the identical broadcasting band is not in the Pch-1 to Pch-6.

If it is decided at Step S22 that the broadcasting band of the designated Pch is not identical to that of the front side, the control unit 41 inhibits the selection of the broadcasting band of the designated Pch. Then, the control unit 41 executes the Pch skipping action (at Step S24) so as to designate the next Pcb on the basis of the Pch selecting order, and transfers to Step S22 so as to judge whether or not the broadcasting band of the Pch designated by that Pch skip action is identical to that of the front side.

Here in case the Pch-2 (i.e., the FM broadcast receiving frequency) is designated on the rear side while the front side is in the AM mode, for example, this AM mode on the front side is changed in the prior art to the FM mode. In the Pch skipping action of Step S24, therefore, the selection of the FM mode of this Pch-2 is inhibited, and the next Pch-3 is designated on the basis of the aforementioned Pch selecting order (Pch-1→Pch-2→Pch-3→- - - , and so on).

If it is decided at Step S21 that the front side is not in the radio mode, on the other hand, the control unit 41 ends these processing actions by executing the receiving action for the rear side output (at Step S25) on the basis of the receiving frequency of the designated Pch through the AM/FM radio tuner unit 13 or the SAT radio tuner unit 14.

If it is decided at Step S20 that the prevailing system setting mode is the single mode, on the other hand, the control unit 41 ends these processing actions by executing the receiving action of the front side and the rear side (at Step S26) on the basis of the receiving frequency of the designated Pch through the AM/FM radio tuner unit 13 or the SAT radio tuner unit 14.

If it is decided at Step S13 that the key operation is not the MODE key, on the other hand, the control unit 41 ends these processing actions by executing another key operation (at Step S27).

According to the rear operation accepting procedure shown in FIG. 5, even if the mode selecting operation demanding the setting of the FM mode is done from the rear operation unit 4 in the dual mode while the front side is in the AM mode, for example, the FM mode selection on the rear side is inhibited, and the SAT mode or the next mode is set. It is, therefore, possible to prevent such a situation reliably that the play-back mode (i.e., the AM mode) being set on the front side is changed by the play-back mode selecting operation of the rear operation unit 4.

According to the rear operation accepting procedure, even if the Pch selecting operation demanding the setting of the FM mode is done from the rear operation unit 4 in the dual mode while the front side is in the AM mode, moreover, the FM mode selection on the rear side is inhibited, and the mode, in which the AM mode being set on the front side is not switched, such as the Pch having registered the receiving frequency of the AM broadcast or the satellite broadcast is selected. It is, therefore, possible to prevent such a situation reliably that the play-back mode (i.e., the AM mode) being set on the front side is changed by the Pch selecting operation of the rear operation unit 4.

According to this embodiment, even if the mode selecting operation demanding the setting of the FM mode is done from the rear operation unit 4 in the dual mode while the front side is in the AM mode, the FM mode selection on the rear side is inhibited. It is, therefore, possible to prevent such a situation reliably that the play-back mode (i.e., the AM mode) being set on the front side is changed by the play-back mode selecting operation of the rear operation unit 4.

According to this embodiment, even if the Pch selecting operation demanding the setting of the FM mode is done from the rear operation unit 4 in the dual mode while the front side is in the AM mode, moreover, the FM mode selection on the rear side is inhibited. It is, therefore, possible to prevent such a situation reliably that the play-back mode (i.e., the AM mode) being set on the front side is changed by the Pch selecting operation of the rear operation unit 4.

Here in the aforementioned embodiment, if the operation to set the rear side in the FM mode is done from the rear operation unit 4 in the dual mode while the front side is in the AM mode, the FM mode selection on the rear side is inhibited. According to the gist of the invention, however, it goes without saying that the AM mode selection on the rear side may be inhibited, in case the operation to set the rear side in the AM mode is done from the rear operation unit 4 in the dual mode while the front side is in the FM mode.

In the aforementioned embodiment, moreover, if the operation to set the rear side in the FM mode is done in the dual mode while the front side is in the AM mode, the FM mode selection on the rear side is inhibited from the standpoint of the front user. According to the gist of the invention, however, it goes without saying that the FM mode selection on the front side may be inhibited from the standpoint of the rear user, in case the operation to set the front side in the FM mode is done in the dual mode while the rear side is in the AM mode.

Moreover, the aforementioned embodiment has been described by enumerating the play-back modes for providing the sound signals of the AM mode, the FM mode, the SAT mode, the CD mode, the DVD mode and soon. However, it goes without saying that similar effects can be attained even if a TV mode for providing video signals is added. Here, in case this TV mode is added to the vehicular audio system 1, this system 1 may be included by incorporating a TV tuner unit into the body device 2 so that the video signals received by the TV tuner may be visually outputted to the display unit.

In the aforementioned embodiment, moreover, if it is decided at Step S22 shown in FIG. 5 that the broadcasting band of the designated Pch has the band identical to that of the front side, the receiving frequency of the Pch designated on the rear side is received at Step S23. There arises no problem, in case the receiving frequency (or program) being received on the front side and the receiving frequency (or program) to be received on the rear side are identical. In case the receiving frequency being received on the front side is different from that to be received on the rear side, however, the receiving frequency of the front side is switched. Even in case the receiving frequencies of the front side and the rear side are different although they are identical bands, therefore, the designation of the receiving frequency of the Pch may be inhibited.

In the aforementioned embodiment, moreover, the AM mode and the FM mode have been described as an example of the play-back mode, in which the play-back mode being set on the front side may be changed by the play-back mode selecting operation on the rear side. However, it goes without saying that similar effects can be obtained for the play-back mode having such probable situation by applying the invention thereto.

In the aforementioned embodiment, moreover, the individual memory areas Pch-1 to Pch-6 of the Pch memory 36 are stored with the receiving frequencies of the radio broadcast. A system construction can be made by connecting a disc changer device, which can house and play back six discs DISC-1 to DISC-6, externally with the body device 2, and by assigning the individual discs in the disc changer device to the memory areas of the Pch memory 36 such as the DISC-1 to the Pch-1, the DISC-2 to the Pch-2, the DISC-3 to the Pch-3, the DISC-4 to the Pch-4, the DISC-5 to the Pch-5, and the DISC-6 to the Pch-6, so that the disc DISC-3 in the disc changer device is played back, for example, when the Pch-3 is selected with the NEXT key.

In case the discs DISC-1 to DISC-6 of the disc changer device are assigned to such Pch memory 36, the DISC-2 being played back on the front side is changed to the DISC-3 when the Pch selecting operation to select and demand the play-back of the DISC-3 on the rear side is done while the DISC-2 is being played back on the front side, for example. In order to cope with this situation, therefore, the invention is applied. The situation, in which the disc being played back on the front side is replaced by another disc can be reliably prevented by inhibiting the DISC selection on the rear side in case the Pch selecting operation to select and demand the play-back of the disc such as the DISC-3 other than the DISC-2 on the rear side while the DISC-2 is being played back on the front side.

Moreover, the aforementioned embodiment has been described by enumerating the CD, the DVD and so on as the play-back function of the play-back source. However, it goes without saying that similar effects can be attained even from the recording medium such as the MD.

Moreover, the aforementioned embodiment has been described by taking up the headphone 6 as an example of the output units on the rear side so that the sound on the rear side may not leak to the user on the front side. However, it goes without saying that similar effects can be obtained even if the output units on the rear side is exemplified by such a highly directive speaker that the sound can be heard by only the rear user without leaking to the front user.

According to the play-back device of the invention, when at least one of play-back sources is selected so that a predetermined operation to output the play-back signals from the at least one of the play-back sources to at least one of output units, it is decided by selecting the at least one of the play-back sources relating to the predetermined operation whether or not a fluctuation occurs in the play-back signals to be outputted from output units other than the at least one of the output units relating to that predetermined operation. If it is decided that the fluctuation occurs in the play-back signals, the selection and change to the at least one of the play-back sources relating to the predetermined operation is inhibited. Even if the operation relating to the selection and change of the play-back sources, as might otherwise change the play-back signals, is done from the rear side while the play-back signals are being outputted from the output units (i.e., the output units other than the at least one of the output units) on the front side, for example, it is possible to prevent such a fluctuation reliably that the play-back signals to be outputted to the output units on the front side are switched.

According to the play-back device of the invention, when there is detected a predetermined operation to select the play-back signals of at least one of broadcasting band signals to be outputted to at least one of output units, in case the play-back signals to be outputted to output units other than the at least one of the output units relating to that predetermined operation are the play-back signals from an broadcast receiving unit, the action to select and change the broadcasting band relating to that the broadcast receiving unit is inhibited. In case the broadcast receiving unit is the AM/FM radio tuner unit acting the AM and FM tuners by itself, therefore, even if the operation relating to the selection and change of the play-back sources (i.e., the FM mode), as might otherwise change the play-back signals, is done from the rear side while the play-back signals of the AM broadcast on the front side are being outputted from the output units (i.e., the output units other than the at least one of the output units) on the front side, for example, it is possible to prevent such a fluctuation reliably that the play-back signals of the AM broadcast to be outputted to the output units on the front side are switched.

What is claimed is:

1. A play-back device comprising:

a plurality of play-back sources;

a plurality of output units for outputting the play-back signals from the individual play-back sources;

a selecting unit for selecting at least one of the play-back sources; and a control unit for controlling the selecting unit so as to select the at least one of the play-back sources for outputting the play-back signals to be outputted to the output units, in response to an operation, wherein the control unit includes:

a fluctuation deciding unit for selecting, when the at least one of the play-back sources is selected and when the operation to output the play-back signals from the at least one of the play-back sources to at least one of the output units is detected, the at least one of the play-back sources relating to the operation, thereby to decide whether a fluctuation occurs in the play-back signals to be outputted from the output units other than the at least one of the output units relating to the operation; and a selection inhibiting unit for inhibiting the selection and change to the at least one of the play-back sources relating to the operation, when the fluctuation occurring in the play-back signals is decided by the fluctuation deciding unit, and wherein the control unit selectively executes a play-back mode skipping operation when the selection inhibiting unit inhibits the selection and changes to the at least one of the play-back sources relating to the operation.

2. A play-back device according to claim 1, wherein at least one of the output units comprises a speaker, and wherein at least one of the output units comprises a headphone.

3. A play-back device according to claim 1, wherein the control unit determines whether the play-back mode skipping operation is accompanied by a band change from a front side of the play-back device.

4. A play-back device according to claim 1, wherein the control unit controls the selecting unit to output the play-back signals in one of a single mode and a dual mode.

5. A play-back device according to claim 1, further comprising a front operation unit and a rear operation unit.

6. A play-back device according to claim 5, wherein the selection inhibiting unit inhibits the selection and change to the at least one of the play-back sources relating to an operation from the rear operation unit.

7. A play-back device according to claim 4, wherein the selection inhibiting unit inhibits the selection and change to the at least one of the play-back sources while in the dual mode.

8. A play-back device according to claim 1, wherein the selecting unit comprises a single mode/dual mode setting device.

9. The play-back device of claim 1, wherein said play-back mode skipping operation is executed when a designated play-back mode is accompanied by a band change on a front side selection.

10. The play-back device of claim 1, wherein said play-back mode skipping operation is executed when a designated preset channel (Pch) does not have a band identical to a band of a front side selection.

* * * * *